US012510654B2

United States Patent
Voormansik et al.

(10) Patent No.: US 12,510,654 B2
(45) Date of Patent: Dec. 30, 2025

(54) METHOD AND SYSTEM FOR CREATING INTERFEROMETRIC COHERENCE DATA PRODUCTS FOR OBJECTS

(71) Applicant: KappaZeta OÜ

(72) Inventors: Kaupo Voormansik, Tartu (EE); Tanel Tamm, Kuressaare (EE); Karlis Zalite, Leiderdorp (NL); Mihkel Veske, Otepää (EE)

(73) Assignee: KappaZeta OÜ, null (EE)

( * ) Notice: Subject to any disclaimer, the term of this patent is extended or adjusted under 35 U.S.C. 154(b) by 348 days.

(21) Appl. No.: 17/993,072

(22) Filed: Nov. 23, 2022

(65) Prior Publication Data
US 2023/0168365 A1 Jun. 1, 2023

(30) Foreign Application Priority Data
Nov. 26, 2021 (EP) ..................... 21210799

(51) Int. Cl.
G01S 13/90 (2006.01)
(52) U.S. Cl.
CPC ................ G01S 13/9023 (2013.01)
(58) Field of Classification Search
CPC .......... G01S 13/9023; G01S 13/9076
See application file for complete search history.

(56) References Cited

U.S. PATENT DOCUMENTS

2012/0019410 A1* 1/2012 Ferretti ............... G01S 13/9023
342/25 C

OTHER PUBLICATIONS

Donato et al, "Urban Areas Enhancement in Multitemporal SAR RGB Images Using Adaptive Coherence window and Texture Information", IEEE Journal of Selected Topics in Applied Earth Observation and Remote Sensing, vol. 9, No. 8, pp. 3740-3752 (Year: 2016).*

D. Amitrano, G. Di Martino, A. Iodice, D. Riccio and G. Ruello, "A New Framework for SAR Multitemporal Data RGB Representation: Rationale and Products," in IEEE Transactions on Geoscience and Remote Sensing, vol. 53, No. 1, pp. 117-133, (Year: 2015).*

(Continued)

*Primary Examiner* — Vladimir Magloire
*Assistant Examiner* — Anna K. Gosling
(74) *Attorney, Agent, or Firm* — Ziegler IP Law Group, LLC.

(57) ABSTRACT

A method for creating interferometric coherence data products for objects imaged by Synthetic Aperture Radar (SAR) having polarization(s). The method includes: for each identifiable object geometry for which there are acquired geocoded interferometric SAR images with flat-earth and topographic phase removed having following pixel values: backscatter intensity (V1) in polarization(s) for master image; backscatter intensity (V2) in polarization(s) for slave image; in-phase component (V3) of geocoded interferogram in polarization(s); and quadratic-phase component (V4) of geocoded interferogram polarization(s), determining which geocoded pixels are within identifiable object geometry considering known geolocation accuracy of identifiable object geometry and geocoded interferometric SAR images; and determining coherence values and statistics of coherence values for objects for polarization(s), based on pixel values V1, V2, V3, and V4 within identifiable object geometry.

18 Claims, 3 Drawing Sheets

(56) References Cited

OTHER PUBLICATIONS

Tzouvaras, M. Statistical Time-Series Analysis of Interferometric Coherence from Sentinel-1 Sensors for Landslide Detection and Early Warning. Sensors (Basel). Oct. 13, 2021 (Year: 2021).*

Shen et al., "PolInSAR Complex Coherence Nonlocal Estimation Using Shape-Adaptive Patches Matching and Tracing-Moment-Based NLRB Estimator", IEEE Transactions on Geoscience and Remote Sensing, vol. 59, No. 1, pp. 260-272,May 19, 2020, 13 pag (Year: 2020).*

Anfinsen Etl Al, "Estimation of the Equivalent Number of Looks in Polarimetric SAR Imagery", 2008 IEEE International Geoscience & Remote Sensing Symposium, pp. IV-487, XP031422906, ISBN: 978-1-4244-2807-6, Jul. 7, 2008, 4 pages.

Arrigoni et al, "Space-Adaptive Coherence Estimation", Proceedings of Fringe 2005, pp. 2-7, Retrieved from the Internet URL: https://www.researchgate.net/publication/252990489_Space-Adaptive_Coherence_Estimation, Jan. 1, 2006, 7 pages.

Donato et al, "Urban Areas Enhancement in Multitemporal SAR RGB Images Using Adaptive Coherence window and Texture Information", IEEE Journal of Selected Topics in Applied Earth Observation and Remote Sensing, vol. 9, No. 8, pp. 3740-3752, XP011621400, ISSN: 1939-1404, DOI:10.1109/JSTARS.2016.2555340, Aug. 1, 2016, 13 pages.

European Patent Office, Extended European Search Report, Application No., 21210799.9, Mailed May 20, 2022, 11 pages.

Shen et al, "PolInSAR Complex Coherence Nonlocal Estimation Using Shape-Adaptive Patches Matching and Tracing-Moment-Based NLRB Estimator", IEEE Transactions on Geoscience and Remote Sensing, vol. 59, No. 1, pp. 260-272, XP011827820, ISSN: 0196-2892, DOI: 10.1109/TGRS.2020.2991837, May 19, 2020, 13 pages.

\* cited by examiner

FOR EACH IDENTIFIABLE OBJECT GEOMETRY FOR WHICH THERE ARE ACQUIRED GEOCODED INTERFEROMETRIC SAR IMAGES HAVING PIXEL VALUES: BACKSCATTER INTENSITY (V1) IN POLARIZATION(S) FOR MASTER IMAGE; BACKSCATTER INTENSITY (V2) IN POLARIZATION(S) FOR SLAVE IMAGE; IN-PHASE COMPONENT (V3) OF GEOCODED INTERFEROGRAM IN POLARIZATION(S); AND QUADRATIC-PHASE COMPONENT (V4) OF GEOCODED INTERFEROGRAM IN POLARIZATION(S), DETERMINE GEOCODED PIXELS WHICH ARE WITHIN IDENTIFIABLE OBJECT GEOMETRY CONSIDERING KNOWN GEOLOCATION ACCURACY OF IDENTIFIABLE OBJECT GEOMETRY AND GEOCODED INTERFEROMETRIC SAR IMAGES
102

DETERMINE COHERENCE VALUES AND STATISTICS OF COHERENCE VALUES FOR OBJECTS FOR POLARIZATION(S), BASED ON PIXEL VALUES V1, V2, V3, AND V4 WITHIN IDENTIFIABLE OBJECT GEOMETRY
104

FIG. 1

METHOD AND SYSTEM FOR CREATING INTERFEROMETRIC COHERENCE DATA PRODUCTS FOR OBJECTS

TECHNICAL FIELD

The present disclosure relates to methods for creating interferometric coherence data products for objects imaged by Synthetic Aperture Radars (SARs) in various polarizations. The present disclosure also relates to systems for creating interferometric coherence data products for objects imaged by SARs in various polarizations. The present disclosure also relates to computer program products for creating interferometric coherence data products for objects imaged by SARs in various polarizations.

BACKGROUND

Over the past few decades, Synthetic Aperture Radar (SAR) technology has gained popularity for several applications (for example, such as topography, oceanography, glaciology, geology, forestry, seismology, and the like). The SAR technology is widely being used for remote sensing and mapping of surfaces of the Earth and other planets in order to provide comprehensive geospatial radar images of such surfaces. Nowadays, the SAR technology is also being used to create interferometric coherence data products for objects that are imaged by SARs. Typically, aerial vehicles (for example, airplanes, drones, satellites, and the like) are equipped with the SARs that are to be used for the aforesaid applications. In general, a SAR transmits electromagnetic wave signals towards a target surface and receives echoes of the electromagnetic wave signals from the target surface along with a time delay for receiving such echoes. A well-ordered combination of received echoes produces a synthetic (namely, a virtual) aperture of the SAR which is usually longer than a physical antenna width of the SAR.

However, existing techniques and systems for creating interferometric coherence data products for objects are associated with several limitations. Firstly, SAR data (that is usually in form of images or image signals) inherently contain speckle which makes processing of the SAR data (for example, SAR data for objects having small sizes and/or complex shapes or geometries) difficult. When estimating coherence, spatial averaging is done using a local neighborhood window and the existing techniques take into account a considerable portion of the SAR data that fall outside objects of interest. This distorts coherence estimation for the objects, and thereby produces unreliable coherence data products for the objects. In an example, for a European Space Agency (ESA) Sentinel Application Platform (SNAP) toolbox, coherence is estimated using a Boxcar averaging window. Due to this, the existing techniques and systems fail to produce (namely, estimate) meaningful and reliable interferometric coherence (for example, repeat-pass and/or single-pass bistatic interferometric coherence) data products for the objects having small sizes and/or complex geometries. Secondly, the existing techniques and systems are not well suited to produce accurate coherence data products for the objects when an absolute location accuracy of the object and a resolution of the SAR are low. In an example, when locations and shapes of the objects are known (such as for agricultural or forest geo-parcels) with low accuracies, inaccurate and unreliable coherence data products may be produced for small and complex shaped objects.

Therefore, in light of the foregoing discussion, there exists a need to overcome the aforementioned drawbacks associated with existing techniques and systems for creating interferometric coherence data products for objects.

SUMMARY

The present disclosure seeks to provide a method for creating interferometric coherence data products for objects imaged by a Synthetic Aperture Radar (SAR) having at least one polarization. The present disclosure also seeks to provide a system for creating interferometric coherence data products for objects imaged by a SAR having at least one polarization. The present disclosure also seeks to provide a computer program product for creating interferometric coherence data products for objects imaged by a SAR having at least one polarization. An aim of the present disclosure is to provide a solution that overcomes at least partially the problems encountered in prior art In a first aspect, an embodiment of the present disclosure provides a method for creating interferometric coherence data products for objects imaged by a Synthetic Aperture Radar (SAR) having at least one polarization, the method comprising:
  for each identifiable object geometry for which there are acquired geocoded interferometric SAR images with flat-earth and topographic phase removed having following pixel values V1, V2, V3, V4:
    a backscatter intensity (V1) in the at least one polarization for a master image;
    a backscatter intensity (V2) in the at least one polarization for a slave image;
    an in-phase component (V3) of a geocoded interferogram in the at least one polarization; and
    a quadratic-phase component (V4) of the geocoded interferogram in the at least one polarization,
  determining which geocoded pixels are within the identifiable object geometry considering a known geolocation accuracy of the identifiable object geometry and the geocoded interferometric SAR images; and
  determining coherence values and statistics of the coherence values for the objects for the at least one polarization, based on the pixel values V1, V2, V3, and V4 within the identifiable object geometry.

In a second aspect, an embodiment of the present disclosure provides a system for creating interferometric coherence data products for objects imaged by a Synthetic Aperture Radar (SAR) having at least one polarization, the system comprising at least one processor configured to execute a method of the first aspect.

In a third aspect, an embodiment of the present disclosure provides a computer program product for creating interferometric coherence data products for objects imaged by a Synthetic Aperture Radar (SAR) having at least one polarization, the computer program product comprising a non-transitory machine-readable data storage medium having stored thereon program instructions that, when accessed by a processing device, cause the processing device to implement a method of the first aspect.

Embodiments of the present disclosure substantially eliminate or at least partially address the aforementioned problems in the prior art, and enable efficient, accurate, and reliable creation of interferometric coherence data products for objects imaged by a SAR.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 1 illustrates generic steps of a method for creating interferometric coherence data products for objects imaged by a Synthetic Aperture Radar (SAR) having at least one polarization, in accordance with an embodiment of the present disclosure;

Figure 2:
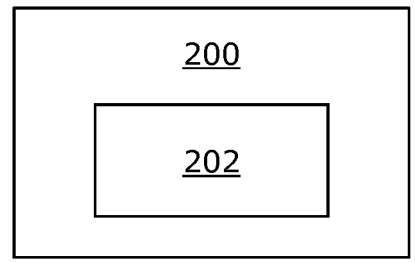
FIG. 2 illustrates a block diagram of architecture of a system for creating interferometric coherence data products for objects imaged by a Synthetic Aperture Radar (SAR) having at least one polarization, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a method for creating interferometric coherence data products for objects imaged by a Synthetic Aperture Radar (SAR) having at least one polarization, the method comprising:

for each identifiable object geometry for which there are acquired geocoded interferometric SAR images with flat-earth and topographic phase removed having following pixel values:
a backscatter intensity (V1) in the at least one polarization for a master image;
a backscatter intensity (V2) in the at least one polarization for a slave image;
an in-phase component (V3) of a geocoded interferogram in the at least one polarization; and
a quadratic-phase component (V4) of the geocoded interferogram in the at least one polarization,
determining which geocoded pixels are within the identifiable object geometry considering a known geolocation accuracy of the identifiable object geometry and the geocoded interferometric SAR images; and
determining coherence values and statistics of the coherence values for the objects for the at least one polarization, based on the pixel values V1, V2, V3, and V4 within the identifiable object geometry.

In a second aspect, an embodiment of the present disclosure provides a system for creating interferometric coherence data products for objects imaged by a Synthetic Aperture Radar (SAR) having at least one polarization, the system comprising at least one processor configured to execute a method of the first aspect.

In a third aspect, an embodiment of the present disclosure provides a computer program product for creating interferometric coherence data products for objects imaged by a Synthetic Aperture Radar (SAR) having at least one polarization, the computer program product comprising a non-transitory machine-readable data storage medium having stored thereon program instructions that, when accessed by a processing device, cause the processing device to implement a method of the first aspect.

The present disclosure provides the aforementioned method, the aforementioned system, and the aforementioned computer program product for creating interferometric coherence data products for objects imaged by a Synthetic Aperture Radar (SAR) having at least one polarization. The method and the system enable in accurately and reliably creating the interferometric coherence data products for the objects imaged by the SAR. The method enables to produce (namely, estimate) meaningful and reliable interferometric coherence (for example, repeat-pass and/or single-pass bistatic interferometric coherence) data products for the objects having small sizes and/or complex shapes or geometries. The method enables in determining only those geocoded pixels that lie within a known geolocation accuracy of the identifiable object geometry in order to compensate for geolocation accuracy between a stated location of the object and an actual location of the object. Greater the geolocation accuracy and a resolution of the SAR, better is the processing of smaller and/or more complex shapes of objects to produce reliable and accurate coherence estimates and data products. The method and the system are effective, reliable and can be implemented with ease.

The "Synthetic Aperture Radar" is a type of an imaging radar that is used for producing high-resolution (or high spatial resolution) images of the objects such as landscapes. Generally, the SAR transmits an energy signal (for example, in form of an electromagnetic signal travelling at a speed of light) towards a target surface comprising the objects, and receiving the energy signal that returns (namely, echoes or backscatters) from the target surface and a time delay of the received energy signal. The high-spatial resolution images are subsequently produced by using an intensity of the energy signal that bounces back from the target surface and the time delay of the received energy signal which typically depends on roughness and electrical conducting properties of the target surface and its distance from the SAR. Typically, the SAR comprises a radar antenna for transmitting and receiving the energy signals. The SAR is well-known in the art. It will be appreciated that the method enables in accurately creating the interferometric coherence data products for the objects imaged by the SAR, the interferometric coherence data products comprising the coherence values and/or the statistics of the coherence values. The method described herein applies for all type of polarization and their combinations.

Optionally, the SAR is a single-pol SAR having a single polarization. In such a case, the single polarization could be either horizontal-horizontal (HH) polarization, or vertical-vertical (VV) polarization. Additionally, or alternatively, optionally, the SAR is a dual-pol SAR having two polarizations. In such a case, the two polarizations could be either HH and horizontal-vertical (HV) polarizations, or VV and vertical-horizontal (VH) polarizations, or HH and VV polarizations. Yet additionally or alternatively, optionally, the SAR is a quad-pol SAR or quasi-quad-pol SAR having four polarizations. In such a case, the four polarizations could be HH, HV, VV, and VH polarizations.

The term "processor" refers to hardware, software, firmware, or a combination of these. The at least one processor is configured to control the operation of the system by executing the aforementioned steps of the method for creating interferometric coherence data products for objects imaged by the SAR having at least one polarization. It will be appreciated that the term "at least one processor" refers to "one processor" in some implementations, and "a plurality of processors" in other implementations.

Optionally, the identifiable object geometry refers to a machine-readable representation of a geometry of an object and a unique identifier of the object. Optionally, the geometry of the object is a vector geometry of the object. Optionally, the unique identifier of the object is utilized to link coherence estimations with the object. Optionally, the geometry of the object and the unique identifier of the object are stored, by the SAR, a data repository that is communicably coupled to the at least one processor. More optionally, the geometry and the unique identifier are stored, at a storage of the data repository. Optionally, in this regard, the geometry and the unique identifier are obtained, by the at least one processor, from the storage of the data repository. Optionally, the data repository comprises at least one storage. In some implementations, the at least one storage is a combined storage. In other implementations, the at least one storage is a distributed storage. It will be appreciated that the data repository could be implemented as a cloud-based memory, a memory of the system, a memory of the SAR, or similar.

Optionally, the method further comprises acquiring the geocoded interferometric SAR images by obtaining a pair of images of an object that is captured by the SAR at different times from a same location or at a same time from different locations, wherein the pair of images comprises the master image and the slave image. Optionally, the pair of images is stored, by the SAR, at the data repository. More optionally, the pair of images is stored, at the storage of the data repository. Optionally, in this regard, the pair of images is obtained, by the at least one processor, from the storage of the data repository.

Optionally, the pair of images is obtained as a Single Look Complex (SLC) product or as a Geocoded Single Look Complex (GSLC) product, wherein a given product comprises both amplitude data and phase data. The "Single Look Complex product" is an image of the object in a slant range by azimuth imaging plane, in an image plane of satellite data acquisition. The "Geocoded Single Look Complex product" is an image of the object upon which a topography compensation is applied according to a common geographic projection and/or a Digital Elevation Model (DEM) for eliminating terrain-induced distortions in the image. Optionally, when acquiring the geocoded interferometric SAR images with flat-earth and topographic phase removed, the pair of images is processed, by the SAR. Optionally, when the pair of images is obtained as the SLC product, the step of acquiring the geocoded interferometric SAR images further comprises geocoding the SLC product. In this regard, a geocoding process is performed on the pair of images when acquiring the geocoded interferometric SAR images. Optionally, when the pair of images is obtained as the GSLC product, the geocoded interferometric SAR images are readily available to the at least one processor. It will be appreciated that the geocoded interferometric SAR images are subsequently utilized by the at least one processor, to generate the geocoded interferogram.

Optionally, the object is small in size and/or has a complex shape as compared to a spatial resolution of the SAR with which the pair of images are captured and to an Absolute Localization Error of the SAR. It will be appreciated that each pixel in the SLC product or GSLC product is represented by a complex magnitude value, and therefore contains both the amplitude data and the phase data. Optionally, the amplitude data and the phase data are represented by 8 bits per pixel, 16 bits per pixel, 32 bits per pixel, or similar. In an example, the master image and the slave image are captured at time instants A1 and A2, respectively, from a location B. In another example, the master image and the slave image are captured at a time instant C, from locations D1 and D2, respectively.

In an embodiment, the pair of images is obtained from the SAR, the SAR being arranged at any of: an airplane, a drone, a satellite, a satellite constellation, any other Earth Observation (EO) instrument. It will be appreciated that when the SAR is arranged at any of the aforementioned aerial vehicles, the SAR utilizes a motion of a given aerial vehicle over the target surface to create a synthetic aperture for the radar antenna. This beneficially allows the SAR to produce the high-resolution images with (relatively small size) radar antenna that is physically arranged in the SAR. This is because larger the radar aperture, higher is the image resolution, regardless of whether the radar aperture is a physical aperture or a synthetic aperture.

Optionally, the method further comprises computing the pixel values V1, V2, V3, and V4 by:
generating the geocoded interferogram using the geocoded interferometric SAR images, wherein the geocoded interferogram comprises pixels that are generated using geocoded pixels of the geocoded interferometric SAR images, the geocoded pixels having a known geolocation accuracy; and
determining backscatter intensity values for the geocoded pixels of the geocoded interferometric SAR images.

The "geocoded interferogram" is a complex image generated by using the geocoded interferometric SAR images. Optionally, when generating the geocoded interferogram using the geocoded interferometric SAR images, the master image is multiplied with a complex conjugate of the slave image. Optionally, in this regard, the in-phase pixels (i component) and the quadratic phase pixels (q component) of the master image is multiplied by the in-phase pixels (i component) and the negative value of the quadratic phase pixels (q component) of the slave image. In an embodiment, when the geocoded interferometric SAR images are acquired by obtaining the pair of images as the SLC product, the geocoded interferogram is generated with a flat earth and topographic phase removal. In another embodiment, when the geocoded interferometric SAR images are acquired by obtaining the pair of images as the GSLC product, the geocoded interferogram is generated without a flat earth and topographic phase removal.

Optionally, the backscatter intensity values depend on at least one of: a type of the object, a size of the object, a shape of the object, an orientation of the object, a moisture content of the target surface, a frequency of the SAR, a polarization of the SAR, an incident angle of radar beam of the SAR. In an example, higher the backscattered intensity value, rougher is the target surface. Optionally, when determining the backscatter intensity values, backscatter intensity values, intensity values of the geocoded pixels of the geocoded interferometric SAR images are converted to the backscatter intensity values by utilizing at least one mathematical formula, provided by a SAR data producer. Optionally, a given backscatter intensity value lies in a range of −30 decibels to 5 decibels. As an example, the given backscatter intensity value may be from −30, −27.5, −25, −22.5, −20, −15, −10, −5, −1, 0, 1 or 2 decibels up to −15, −12.5, −9.5, −5, 0.5, 2.5, 4 or 5 decibels. In an example, the backscatter intensity values for 5 geocoded pixels G1, G2, G3, G4, and G5 may be −20.5 decibels, −15 decibels, 5 decibels, 2.2 decibels, and −1 decibel, respectively.

Further, the pixel values V1, V2, V3, and V4 are computed by utilizing the geocoded interferogram and the backscatter intensity values. It will be appreciated that said pixel values are subsequently used as a preprocessed information to determine the coherence values and the statistics of the coherence values. Furthermore, generation of such pixel values can be performed by employing any requisite SAR data processing technique. For the at least one polarization, the in-phase component (V3) of the geocoded interferogram is a real part of a complex magnitude value, while the quadratic-phase component (V4) of the geocoded interferogram is an imaginary part of the complex magnitude value.

Optionally, the step of determining which geocoded pixels are within the identifiable object geometry comprises:
  decreasing a geometry of an object by at least an amount equal to a sum of an Absolute Localization Error (ALE) of a given image amongst the geocoded interferometric SAR images and an ALE of the geometry of the object; and
  identifying those geocoded pixels amongst the geocoded pixels which lie within the decreased geometry of the object as geocoded pixels of a set.

Typically, the SAR has a limitation on how accurately a location of the object can be determined with respect to a known geographic reference (for example, such as a two-dimensional (2D) geographic reference known as World Geodetic System (WGS) 84 (namely, EPSG:4326)). When the geocoded pixels are overlaid with known geographic reference pixels, there is a potential mismatch between a predicted location of the object and an actual location of the object. Pursuant to embodiments of the present disclosure, an ALE correction (namely, an inverse buffer) is applied to the geometry of the object in order to compensate for geolocation accuracy between the stated location of the object and the actual location of the object. The "Absolute Localization Error" refers to a difference between the predicted location of the object in the given image and the actual location of the object (that is obtained from the known geographic reference). In an example, the geometry of the object (for example, an agricultural parcel) may be decreased by an amount of 6 meters when the ALE of the given image is equal to 4 meters and the ALE of the geometry of the object is equal to 2 meters. It will be appreciated that since the geocoded pixels of the set are identified as the geocoded pixels which lie within the decreased geometry of the object, it is ensured that such geocoded pixels are within the actual location of the object. Beneficially, this subsequently enables in accurately and reliably determining the coherence values and the statistics of the coherence values.

Optionally, the method further comprises determining whether or not an Equivalent Number of Looks (ENL) of the geocoded pixels within the identifiable object geometry is equal or greater than a predefined ENL threshold. The "Equivalent Number of Looks" is defined as a number of linearly independent measurements considering a spatial resolution of the pair of images (namely, SAR data) or the geocoded interferometric SAR images. Optionally, when determining the ENL of the geocoded pixels within the identifiable object geometry, the at least one processor is configured to count a number of geocoded pixels inside a given object and calculate the ENL by using a geocoded pixel count and by taking into account an area of a single geocoded pixel inside the given object and an area of a single look (which is calculated as a product of a spatial resolution in a range direction and a spatial resolution in an azimuth direction) of the SAR. Typically, the ENL is a parameter in multi-looking of the SAR data that describes a degree of averaging applied to the SAR data. It will be appreciated that the ENL improves SAR image-quality by mitigating noise-like effects known as speckle. The Multi-looking and the determination of the ENL are well-known in the art. It may be understood that there is no universal value of the predefined ENL threshold. The predefined ENL threshold may be determined by taking into account a compromise between the spatial resolution of the SAR data and a dynamic range of coherence values for the object (for example, preferably low values of the coherence values for the object). The predefined ENL threshold may depend on a task on hand and the SAR data.

In an embodiment, when it is determined that the ENL of the geocoded pixels within the identifiable object is greater than or equal to the predefined ENL threshold, concluding that coherence can potentially be estimated for the object. It will be appreciated that, based on the pixels values V1, V2, V3, and V4 the coherence values and the statistics of the coherence values for the given object for the at least one polarization are subsequently determined for the given object. In another embodiment, when it is determined that the ENL of the geocoded pixels is not greater than or equal to the predefined ENL threshold, concluding that coherence cannot be estimated for the object. In such a case, the pixels values V1, V2, V3, and V4, are not determined for the given object, and the coherence values and the statistics of the coherence values for the given object for the at least one polarization are not determined.

Optionally, the method further comprises:
  dividing the set of geocoded pixels into at least one grid cell of a grid whose size is determined by a predefined ENL threshold; and
  determining whether or not an ENL of a given grid cell is greater than or equal to the predefined ENL threshold.

Optionally, when dividing the set of geocoded pixels into the at least one grid cell of the grid, the at least one processor is configured to employ at least one image processing algorithm. Optionally, the at least one image processing algorithm is at least one of: a sliding window algorithm, an image segmentation algorithm, an image slicing algorithm, or a square-shape grid slicing algorithm. Optionally, a shape of a given grid cell is one of: a square, a rectangle, a polygon, a circle, an ellipse, a freeform shape.

It will be appreciated that the at least one grid cell has at least one geocoded pixel from amongst the set of geocoded pixels. In an example, the square grid comprises 4 grid cells E1, E2, E3, and E4, wherein the grid cell E1 has 4 geocoded pixels, the grid cell E2 has 6 geocoded pixels, the grid cell E3 has 12 geocoded pixels, and the grid cell E4 has 1 geocoded pixel, from amongst the set of geocoded pixels.

Optionally, the method further comprises determining the ENL of the given grid cell. Optionally, when determining the ENL of the given grid cell, the at least one processor is configured to count a number of geocoded pixels inside the given grid cell and calculate the ENL by using a geocoded pixel count and by taking into account an area of a single geocoded pixel inside the given grid cell and an area of a single look (which is calculated as a product of a spatial resolution in a range direction and a spatial resolution in an azimuth direction) of the SAR. Optionally, when determining whether or not the ENL of the given grid cell is greater than or equal to the predefined ENL threshold, the ENL of the given grid cell is compared with the predefined ENL threshold.

In an embodiment, when it is determined that the ENL of the given grid cell is greater than or equal to the predefined ENL threshold, concluding that coherence can potentially be estimated for the grid cell. It will be appreciated that the statistics of the coherence values for the given object for the at least one polarization are subsequently determined, based on the grid cell value determined for the given grid cell. Optionally, the step of determining whether or not the ENL of the given grid cell is greater than or equal to the predefined ENL threshold is performed after the step of dividing the set of geocoded pixels into the at least one grid cell, and before the step of determining, the grid cell value for the at least one grid cell.

In another embodiment, when it is determined that the ENL of the given grid cell is not greater than or equal to the predefined ENL threshold, the method further comprises:
regrouping geocoded pixels inside the given grid cell with geocoded pixels inside at least one neighboring grid cell of the given grid cell to generate a merged grid cell; and
determining whether or not ENL of the merged grid cell is greater than or equal to the predefined ENL threshold, wherein when it is determined that the ENL of the merged grid cell is greater than or equal to the predefined ENL threshold, concluding that coherence can potentially be estimated for the merged grid cell.

When it is determined that the ENL of the given grid cell is not greater than or equal to the predefined ENL threshold, it is to be understood that the ENL of the given grid cell is less than the predefined ENL threshold. In such a case, merged grid cell(s) is/are optionally generated to facilitate in determining the coherence values for the given grid cell and based on grid cell values the statistics of the coherence values for the object for the at least one polarization. It will be appreciated that the merged grid cell is generated in a manner that the merged grid cell has the geocoded pixel(s) of the given grid cell as well as the geocoded pixel(s) of the at least one neighboring grid cell. The at least one neighboring grid cell optionally has at least one geocoded pixel.

The ENL of the merged grid cell is calculated by the at least one processor in a similar manner as calculated for the ENL of the given grid cell. Furthermore, the coherence values for the merged grid cell for the at least one polarization are subsequently determined, based on the grid cell values determined for the merged grid cell.

Optionally, the step of regrouping the geocoded pixels inside the given grid cell with the geocoded pixels inside the at least one neighboring grid cell comprises:
determining whether or not there is at least one Rook's case neighboring grid cell;
when it is determined that there is at least one Rook's case neighboring grid cell,
determining ENL of the Rook's case neighboring grid cells, and
when at least one Rook's case neighboring grid cells have ENLs greater than zero, using a given Rook's case neighboring grid cell having a minimum ENL from amongst the at least one Rook's case neighboring grid cells, for merging with the given grid cell to generate the merged grid cell;
when it is determined that the at least one neighboring grid cell does not have Rook's case neighboring grid cells, determining whether or not the at least one neighboring grid cell has Queen's case neighboring grid cells;
when it is determined that the at least one neighboring grid cell has Queen's case neighboring grid cells,
determining ENL of the Queen's case neighboring grid cells, and
when at least one Queen's case neighboring grid cells have ENLs greater than zero, using a given Queen's case neighboring grid cell having a minimum ENL from amongst the at least one Queen's case neighboring grid cells, for merging with the given grid cell to generate the merged grid cell; and
when it is determined that the at least one neighboring grid cell does not have Queen's case neighboring grid cells,
determining ENL of all grid cells except the given grid cell, and
using a grid cell that is closest to the given grid cell and having an ENL greater than zero, for merging with the given grid cell to generate the merged grid cell.

The neighboring grid cell(s) which share(s) a common edge with the given grid cell are understood to be the Rook's case neighboring grid cells. When it is determined that the at least one neighboring grid cell has the Rook's case neighboring grid cells, the Rook's case neighboring grid cells are taken into account one by one, for regrouping with the given grid cell to generate the merged grid cell. Moreover, the neighboring grid cell(s) which share(s) a common edge as well as the neighboring grid cell(s) which share(s) a common corner with the given grid cell are understood to be the Queen's case neighboring grid cells. When it is determined that the at least one neighboring grid cell has the Queen's case neighboring grid cells, the Queen's case neighboring grid cells are taken into account one by one, for regrouping with the given grid cell to generate the merged grid cell. Furthermore, when it is determined that the at least one neighboring grid cell neither has the Rook's case neighboring grid cells nor the Queen's case neighboring grid cells, the grid cell that is closest to the given grid cell and has the ENL greater than zero, is used for regrouping with the given grid cell to generate the merged grid cell. It will be appreciated that the regrouping the geocoded pixels inside the given grid cell is performed by gradually increasing a scope of geocoded pixels which can be merged inside the given grid cell.

Beneficially, this enables in generating precise and small-sized merged grid cells.

Optionally, when it is determined that the ENL of the merged grid cell is not greater than or equal to the predefined ENL threshold, the method further comprises:
  determining whether or not all grid cells within the object are merged; and
  concluding that coherence cannot be estimated for the object when it is determined that all the grid cells within the object are merged.

When it is determined that the ENL of the merged grid cell is not greater than or equal to the predefined ENL threshold, it is to be understood that the ENL of the merged grid cell is less than the predefined ENL threshold. Optionally, when it is determined that all the grid cells within the object for which ENL is less than the predefined ENL threshold are un-merged, the step of regrouping, the step of determining whether or not the ENL of the merged grid cell is greater than or equal to the predefined ENL threshold, and the step of determining whether or not all the grid cells within the object, are performed iteratively for all those un-merged grid cells, until (i) upon merging, the ENL of the merged grid cell is greater than or equal to the predefined ENL threshold, or (ii) it is concluded that the coherence cannot be estimated for the object.

When it is determined that the ENL of the geocoded pixels within the object is greater than or equal to the predefined ENL threshold, the coherence value is determined for the given object for the at least one polarization and the statistics of the coherence values for the given object for the at least one polarization are determined based on the coherence values of the grid cells, and/or the merged grid cells for which the ENL is greater than or equal to the predefined ENL threshold. The "coherence" refers to a performance parameter of an interferometric process of the SAR data. Such a coherence represents a cross-correlation coefficient between two co-registered complex images (notably, the master image and the slave image) for a given polarization. By definition, a coherence value lies in a range of 0 (indicating no correlation between the master image and the slave image) to 1 (a perfect correlation between the master image and the slave image). Furthermore, the coherence indicates how well corresponding pixels of the master image and the slave image look alike (or are coherent). It will be appreciated that the method described herein enables in producing meaningful and reliable measurements of the coherence values (and the statistics of the coherence values) for the objects with small sizes and/or complex shapes or geometries.

In an embodiment, the method further comprises:
  determining whether or not coherence can be estimated for a given object for the at least one polarization, wherein said determination is made by evaluating the following expression (1) for the given object for each polarization:

$$\left(\sum_{\substack{pixels\ in\\object}} V3\right)^2 + \left(\sum_{\substack{pixels\ in\\object}} V4\right)^2 > 0 \text{ AND} \qquad (1)$$

$$\sum_{\substack{pixels\ in\\object}} V1 * \sum_{\substack{pixels\ in\\object}} V2 > 0;$$

when it is determined that the expression (1) is TRUE for the given object for a given polarization, then expression (2) is used to determine a coherence value $\gamma_{polarization\ N}$ for the given object for the given polarization, wherein the expression (2) is:

$$\gamma_{polarization\ N} = \frac{\sqrt{\left(\sum_{\substack{pixels\ in\\object}} V3\right)^2 + \left(\sum_{\substack{pixels\ in\\object}} V4\right)^2}}{\sqrt{\sum_{\substack{pixels\ in\\object}} V1 * \sum_{\substack{pixels\ in\\object}} V2}}; \qquad (2)$$

and
  when it is determined that the expression (1) is FALSE for the given object for a given polarization, then concluding that coherence cannot be estimated for the given object for the given polarization.

In this regard, the expressions (1) and (2) are utilized in determining a feasibility of coherence estimation for the given object and coherence values for the given object, respectively. The evaluation of the expression (1) includes an arithmetic processing (such as summation, squaring, addition, and the like) and logical operation(s) (such as a logical operator 'AND'). Depending on a number of polarizations available for the given object, a number of evaluations of the expression (1) would be equal to the number of polarizations. Optionally, the at least one processor performs said evaluations for all the polarizations in a parallel manner. Beneficially, this enables in high processing resource utilization of the at least one processor and a low latency in performing such evaluations.

In another embodiment, the method further comprises:
  determining whether or not coherence can be estimated for the given grid cell for the at least one polarization, wherein said determination is made by evaluating the following expression (3) for a given grid cell for each polarization:

$$\left(\sum_{\substack{pixels\ in\\grid\ cell}} V3\right)^2 + \left(\sum_{\substack{pixels\ in\\grid\ cell}} V4\right)^2 > 0 \text{ AND} \qquad (3)$$

$$\sum_{\substack{pixels\ in\\grid\ cell}} V1 * \sum_{\substack{pixels\ in\\grid\ cell}} V2 > 0;$$

when it is determined that the expression (3) is TRUE for the given grid cell for a given polarization, then expression (4) is used to determine a coherence value $\gamma_{polarization\ N}$ for the given grid cell for the given polarization, wherein the expression (2) is:

$$\gamma_{polarization\ N} = \frac{\sqrt{\left(\sum_{\substack{pixels\ in\\grid\ cell}} V3\right)^2 + \left(\sum_{\substack{pixels\ in\\grid\ cell}} V4\right)^2}}{\sqrt{\sum_{\substack{pixels\ in\\grid\ cell}} V1 * \sum_{\substack{pixels\ in\\grid\ cell}} V2}}; \qquad (4)$$

and
  when it is determined that the expression (3) is FALSE for the given cell for a given polarization, then concluding that coherence cannot be estimated for the given grid cell for the given polarization.

In this regard, the expressions (3) and (4) are utilized in determining a feasibility of coherence estimation for the given grid cell and coherence values for the given grid cell, respectively. The evaluation of the expression (3) includes an arithmetic processing (such as summation, squaring, addition, and the like) and logical operation(s) (such as a logical operator 'AND'). Depending on a number of polarizations available for the at least one grid cell, a number of evaluations of the expression (3) would be equal to the number of polarizations. Optionally, the at least one processor performs evaluations for all the polarizations in a parallel manner. Beneficially, this enables in high processing resource utilization of the at least one processor and a low latency in performing such evaluations. In an example, the SAR may be the dual-pol SAR having the VV polarization and the VH polarization. The set of geocoded pixels may be divided into 2 grid cells G1 and G2. Herein, the expression (3) may be: TRUE for the grid cell G1 for the VV polarization; FALSE for the grid cell G1 for the VH polarization; FALSE for the grid cell G2 for the VV polarization; and TRUE for the grid cell G2 for the VH polarization. In such a case, the coherence values are only determined for the grid cell G1 for the VV polarization and for the grid cell G2 for the VH polarization.

Optionally, the step of determining the statistics of coherence values for the objects for the at least one polarization is based on the coherence values of the grid cells from the given object for the given polarization, wherein the statistics comprise at least one of: a minimum value, a maximum value, an average value, a median value, a standard deviation value. The statistics of the coherence values for the object for the at least one polarization are determined (namely, calculated) by using the coherence values for the given grid cells (that are determined using the expression (4)). Optionally, the at least one processor is configured to employ at least one mathematical formula for determining the statistics of the coherence values. It will be appreciated that when the set of geocoded pixels within given object have a single merged grid cell with a specific coherence value, then the minimum value, the maximum value, the average value, and the median value of the statistics are equal, and the standard deviation value is equal to zero.

Throughout the present disclosure, the term "computer program product" refers to a software product comprising the program instructions that are recorded on the non-transitory machine-readable storage medium, wherein the software product is executable upon the processing device for implementing the aforementioned steps of the method for creating interferometric coherence data products for objects imaged by a Synthetic Aperture Radar (SAR) having at least one polarization. Examples of the non-transitory machine-readable storage medium include, but are not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or any suitable combination thereof.

Experimental Part

An experimental comparison between the method of the present disclosure and an existing technique for creating interferometric coherence data products for objects imaged by a Synthetic Aperture Radar (SAR) was performed. Same number of geo-parcels for two agricultural regions X and Y were taken and subjected to the method of the present disclosure and the existing technique. A 'geo-parcel' can be understood to be uniform spatial entity in a given agricultural region. In this experiment, these objects were actual agricultural parcels. The borders are determined by the cadastral units (ownership) and/or agreements within farmers to rent land and/or to grow certain crops on certain areas. Table 1 given hereinbelow represents a comparison of coherence estimation for the geo-parcels in regions X and Y using the method of the present disclosure and the existing technique. It was experimentally observed that a total number of geo-parcels whose coherence estimation is reliably possible using the method described herein is much higher than a total number of geo-parcels whose coherence estimation is possible using the existing technique, for both the regions X and Y. Based on the Table 1, it was also observed that the method of the present disclosure provides much higher percentages of count ratio and area ratio of usable geo-parcels as compared to that of the existing technique, for both the regions X and Y.

TABLE 1

| Coherence estimation by | Region | Total number of geo-parcels | Total number of geo-parcels whose coherence estimation is possible | Count ratio of usable geo-parcels (%) | Area ratio of usable geo-parcels (%) |
|---|---|---|---|---|---|
| Existing technique | X | 175903 | 64284 | 36.54 | 81.11 |
| Method of the present disclosure | X | 175903 | 145686 | 82.82 | 99.05 |
| Existing technique | Y | 2522622 | 120375 | 4.77 | 38.74 |
| Method of the present disclosure | Y | 2522622 | 1143275 | 45.32 | 90.49 |

DETAILED DESCRIPTION OF THE DRAWINGS

Figure 3:
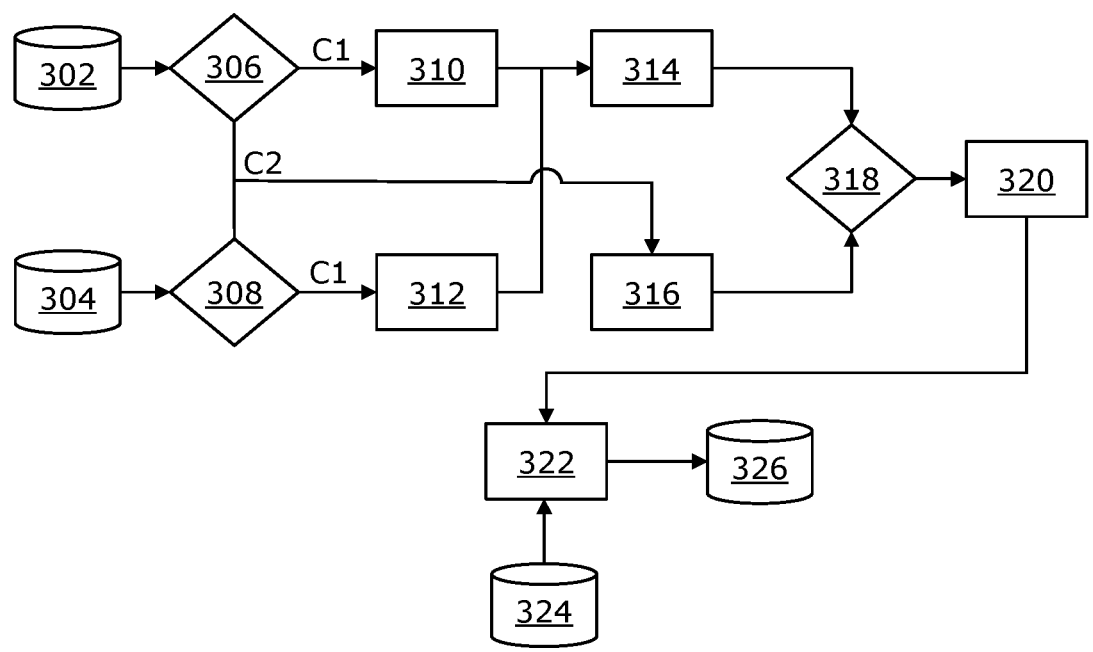
FIG. 3 illustrates a brief exemplary process flow for creating interferometric coherence data products for objects imaged by a Synthetic Aperture Radar (SAR) having at least one polarization, in accordance with an embodiment of the present disclosure.

Referring to FIG. 1, illustrated are generic steps of a method for creating interferometric coherence data products for objects imaged by a Synthetic Aperture Radar (SAR) having at least one polarization, in accordance with an embodiment of the present disclosure. More general overview is illustrated in FIG. 3. Referring to FIG. 1 at step 102, for each identifiable object geometry for which there are acquired geocoded interferometric SAR images with flat-earth and topographic phase removed having following pixel values: a backscatter intensity (V1) in the at least one polarization for a master image; a backscatter intensity (V2)

in the at least one polarization for a slave image; an in-phase component (V3) of a geocoded interferogram in the at least one polarization; and a quadratic-phase component (V4) of the geocoded interferogram in the at least one polarization, geocoded pixels which are within the identifiable object geometry are determined considering a known geolocation accuracy of the identifiable object geometry and the geocoded interferometric SAR images. At step 104, coherence values and statistics of the coherence values for the objects for the at least one polarization are determined, based on the pixel values V1, V2, V3, and V4 within the identifiable object geometry.

The steps 102 and 104 are only illustrative and other alternatives can also be provided where one or more steps are added, one or more steps are removed, or one or more steps are provided in a different sequence without departing from the scope of the claims herein.

Referring to FIG. 2, illustrated is a block diagram of architecture of a system 200 for creating interferometric coherence data products for objects imaged by a Synthetic Aperture Radar (SAR) having at least one polarization, in accordance with an embodiment of the present disclosure. The system 200 comprises at least one processor (depicted as a processor 202). Notably, the processor 202 is configured to execute steps 102 and 104 of the method illustrated in FIG. 1.

It may be understood by a person skilled in the art that the FIG. 2 includes a simplified architecture of the system 200 for sake of clarity, which should not unduly limit the scope of the claims herein. The person skilled in the art will recognize many variations, alternatives, and modifications of embodiments of the present disclosure.

Referring to FIG. 3, illustrated is a brief exemplary process flow for creating interferometric coherence data products for objects imaged by a Synthetic Aperture Radar (SAR) having at least one polarization, in accordance with an embodiment of the present disclosure. A master image of a pair of images of an object that is captured by the SAR, is obtained from a storage 302. A slave image of the pair of images is obtained from a storage 304. At 306, it is determined if the master image is obtained as a Single Look Complex (SLC) product. At 308, it is determined if the slave image is obtained as an SLC product. In one case depicted as C1, when the master image and the slave image are both obtained as the SLC products, then at 310 and 312, geocoding processes are performed on the master image and the slave image, respectively. Upon performing the geocoding processes, at 314, a geocoded interferogram is generated with a flat earth and topographic phase removal, using the master image and the slave image. In another case depicted as C2, when both the master image and the slave image are not obtained as the SLC products, it is determined that the master image and the slave image are both obtained as Geocoded Single Look Complex (GSLC) products. Then at 316, a geocoded interferogram is generated without a flat earth and topographic phase removal, using the master image and the slave image. At 318, the process flow proceeds from either 314 or 316. At 320, backscatter intensity values for the master and slave images determined. At 322, coherence values and statistics of coherence values are determined for the objects for the at least one polarization. Notably, a geometry of the object and a unique identifier of the object are obtained from a storage 324. The statistics of the coherence values are stored at a storage 326. It will be appreciated that the process flow from 302 and 304 to 320 is to be understood to be a preprocessing stage, while the process flow from 322 to 326 is to be understood to be a coherence estimation stage.

Figure 4:
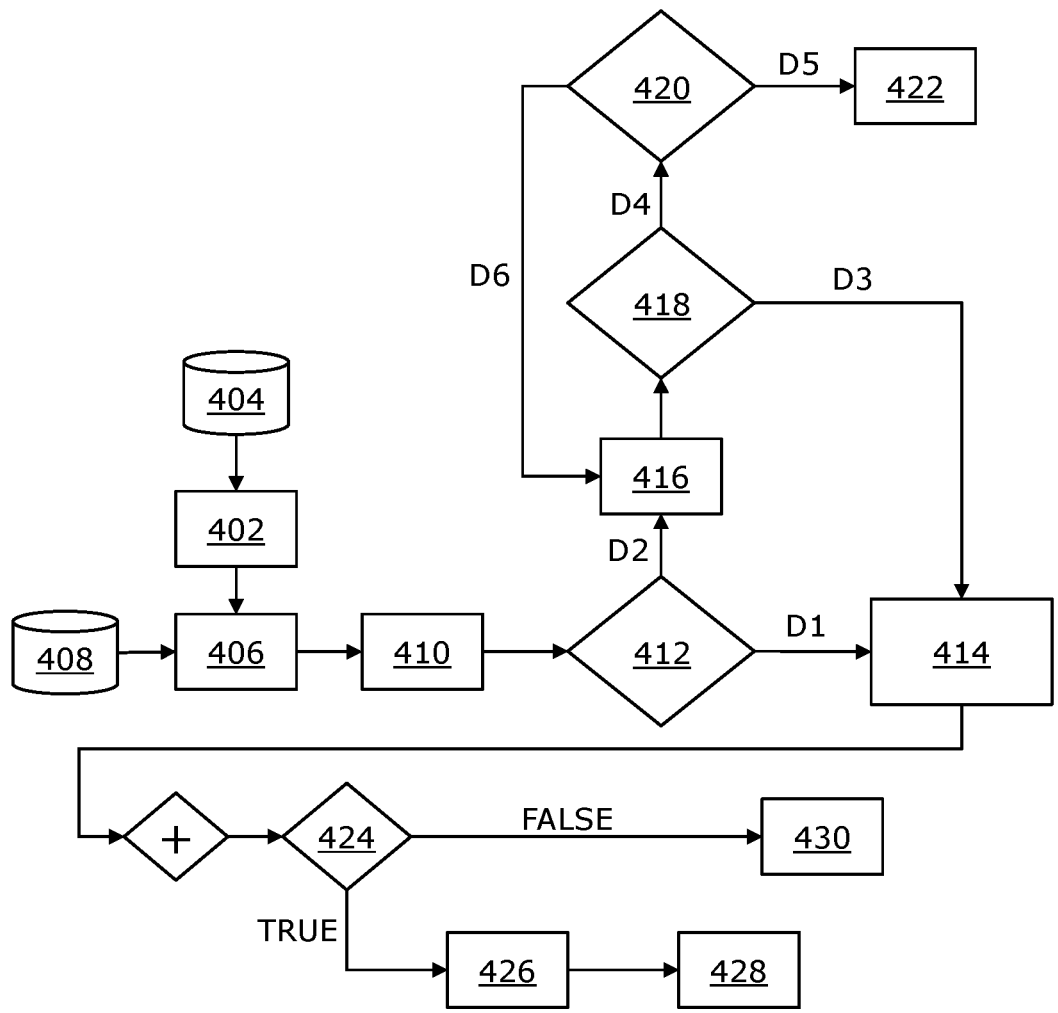
FIG. 4 illustrates a detailed exemplary process flow for determining coherence values and statistics of coherence values for objects for at least one polarization, in accordance with an embodiment of the present disclosure.

Referring to FIG. 4, illustrated is a detailed exemplary process flow for determining statistics of coherence values for objects for at least one polarization, in accordance with an embodiment of the present disclosure. At 402, a geometry of an object is decreased by at least an amount equal to a sum of an Absolute Localization Error (ALE) of a given image amongst a pair of images (comprising a master image and a slave image) of the object captured by the SAR and an ALE of the geometry of the object. Notably, the geometry of the object and a unique identifier of the object are obtained from a storage 404. At 406, geocoded pixels (of a geocoded interferogram and the backscatter intensity images of master and slave images) which lie within the decreased geometry of the object are determined as the geocoded pixels of a set. The pixel values: a backscatter intensity (V1) in the at least one polarization for a master image, a backscatter intensity (V2) in the at least one polarization for a slave image; an in-phase component (V3) of a geocoded interferogram in the at least one polarization, and a quadratic-phase component (V4) of the geocoded interferogram in the at least one polarization, are obtained from a storage 408. At 410, the set of geocoded pixels within a sum of ALE corrected geometry is divided into at least one grid cell of a grid (such as a square grid). At 412, it is determined if an Equivalent Number of Looks (ENL) of a given grid cell is greater than or equal to a predefined ENL threshold. In one case depicted as D1, when the ENL of the given grid cell is greater than or equal to the predefined ENL threshold, then at 414, it is concluded that coherence can potentially be estimated for the object. In another case D2, when the ENL of the given grid cell is not greater than or equal to the predefined ENL threshold, then at 416, geocoded pixels inside the given grid cell are regrouped with geocoded pixels inside at least one neighboring grid cell of the given grid cell to generate a merged grid cell. Then at 418, it is determined if ENL of the merged grid cell is greater than or equal to the predefined ENL threshold. In one case depicted as D3, when the ENL of the merged grid cell is greater than or equal to the predefined ENL threshold, then at 414, it is concluded that coherence can potentially be estimated for the grid cell. In another case depicted as D4, when the ENL of the merged grid cell is not greater than or equal to the predefined ENL threshold, then at 420, it is determined if all grid cells within the object for which ENL is less than the predefined ENL threshold are merged. In one case depicted as D5, when all the grid cells within the object are merged and there are no grid cells for which ENL of a given grid cell is greater than or equal to a predefined ENL threshold, then at 422, it is concluded that coherence cannot be estimated for the object. In another case depicted as D6, when all the grid cells within the object for which ENL is less than the predefined ENL threshold are un-merged, then 416, 418, and 420 are repeated for all those un-merged grid cells whose ENL is less than the predefined ENL threshold.

It will be appreciated that coherence estimation for the at least one grid cell for multiple polarizations is optionally performed in parallel. At 424, for each grid cell it is determined if coherence can be estimated for the at the grid cell for the at least one polarization, wherein said determination is made by evaluating the following expression (1) for a given grid cell for each polarization:

$$\left(\sum_{\substack{pixels\ in\\grid\ cell}} V3\right)^2 + \left(\sum_{\substack{pixels\ in\\grid\ cell}} V4\right)^2 > 0 \text{ AND} \quad (1)$$

$$\sum_{\substack{pixels\ in\\grid\ cell}} V1 * \sum_{\substack{pixels\ in\\grid\ cell}} V2 > 0$$

In one case, when the expression (1) is TRUE for the given grid cell for a given polarization, then at 426, a coherence value $\gamma_{polarization\ N}$ is determined for the given grid cell for the given polarization using the following expression (2):

$$\gamma_{polarization\ N} = \frac{\sqrt{\left(\sum_{\substack{pixels\ in\\grid\ cell}} V3\right)^2 + \left(\sum_{\substack{pixels\ in\\grid\ cell}} V4\right)^2}}{\sqrt{\sum_{\substack{pixels\ in\\grid\ cell}} V1 * \sum_{\substack{pixels\ in\\grid\ cell}} V2}} \quad (2)$$

Thereafter, at 428, the statistics of coherence values for the objects are determined for the at least one polarization based on the coherence values of the grid cells. In another case, when the expression (1) is FALSE for the given cell for a given polarization, then at 430, it is concluded that coherence cannot be estimated for the given grid cell for the given polarization.

Figure 5A:
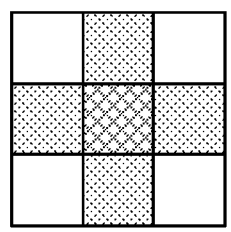
FIGS. 5A and 5B illustrate Rook's case neighboring grid cells and Queen's case neighboring grid cells, respectively, of a given grid cell, in accordance with an embodiment of the present disclosure.
Figure 5B:
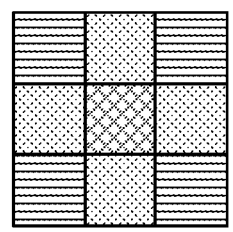

Referring to FIGS. 5A and 5B, illustrated are Rook's case neighboring grid cells and Queen's case neighboring grid cells, respectively, of a given grid cell, in accordance with an embodiment of the present disclosure. Herein, a set of geocoded pixels (not shown) are divided into 3×3 square grid comprising 9 grid cells. The given grid cell is shown as a central grid cell (depicted as a diamond patterned cell) amongst the 9 grid cells. In FIG. 5A, the 4 grid cells (depicted as four dotted patterned cells) which share common edges with the given grid cell are the Rook's case neighboring grid cells. In FIG. 5B, the 4 grid cells (depicted as four dotted patterned cells) which share common edges with the given grid cell and the 4 grid cells (depicted as four horizontal patterned cells) which share common corners with the given grid cell are the Queen's case neighboring grid cells.

It may be understood by a person skilled in the art that the FIGS. 3, 4, 5A and 5B are merely examples for sake of clarity, which should not unduly limit the scope of the claims herein. The person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for creating interferometric coherence data products for objects imaged by a Synthetic Aperture Radar (SAR) having at least one polarization the method comprising:
for each identifiable object geometry for which there are acquired geocoded interferometric SAR images generated from SAR image pairs and processed with flat-earth and topographic phase components removed, the images having the following pixel values:
a backscatter intensity V1 in the at least one polarization for a master image;
a backscatter intensity V2 in the at least one polarization for a slave image;
an in-phase component V3 of a geocoded interferogram in the at least one polarization; and
a quadratic-phase component V4 of the geocoded interferogram in the at least one polarization,
determining, using a processor, which geocoded pixels are within the identifiable object geometry considering a known geolocation accuracy of the identifiable object geometry and the geocoded interferometric SAR images; and
determining, using a processor, coherence values and statistics of the coherence values for the objects for the at least one polarization, based on the pixel values V1, V2, V3, and V4 within the identifiable object geometry.

2. The method according to claim 1, wherein the identifiable object geometry refers to a machine-readable representation of a geometry of an object and a unique identifier of the object.

3. The method according to claim 1, further comprising acquiring the geocoded interferometric SAR images by obtaining a pair of images of an object that is captured by the SAR at different times from a same location or at a same time from different locations, wherein the pair of images comprises a master image and a slave image.

4. The method according to claim 1, further comprising computing the pixel values V1, V2, V3, and V4 by:
generating the geocoded interferogram using the geocoded interferometric SAR images, wherein the geocoded interferogram comprises pixels that are generated using geocoded pixels of the geocoded interferometric SAR images, the geocoded pixels having a known geolocation accuracy; and
determining backscatter intensity values for the geocoded pixels of the geocoded interferometric SAR images.

5. The method according to claim 1, wherein the step of determining which geocoded pixels are within the identifiable object geometry comprises:
obtaining an Absolute Localization Error (ALE) corrected geometry of an object by applying an inverse buffer that is equal to a sum of an Absolute Localization Error (ALE) of a given image amongst the geocoded interferometric SAR images and an ALE of the geometry of the object to the geometry of the object; and
identifying those geocoded pixels amongst the geocoded pixels which lie within the ALE corrected geometry of the object as geocoded pixels of a set.

6. The method according to claim 1, further comprising determining whether or not an Equivalent Number of Looks (ENL) of the geocoded pixels within the identifiable object geometry is equal or greater than a predefined ENL threshold.

7. The method according to claim 6, wherein when it is determined that the ENL of the geocoded pixels within the identifiable object is greater than or equal to the predefined ENL threshold, concluding that coherence can reliably be estimated for the object.

8. The method according to claim 6, wherein when it is determined that the ENL of the geocoded pixels is not greater than or equal to the predefined ENL threshold, concluding that coherence cannot reliably be estimated for the given object.

9. The method according to claim 1, further comprising:
dividing the set of geocoded pixels that lies within the ALE corrected geometry of the object into at least one grid cell of a grid whose size is determined by a predefined ENL threshold; and
determining whether or not an ENL of a given grid cell is greater than or equal to the predefined ENL threshold.

10. The method according to claim 9, wherein when it is determined that the ENL of the given grid cell is greater than or equal to the predefined ENL threshold, concluding that coherence can reliably be estimated for the grid cell.

11. The method according to claim 9, wherein when it is determined that the ENL of the given grid cell is not greater than or equal to the predefined ENL threshold, the method further comprises:
regrouping geocoded pixels inside the given grid cell with geocoded pixels inside at least one neighboring grid cell of the given grid cell to generate a merged grid cell; and
determining whether or not ENL of the merged grid cell is greater than or equal to the predefined ENL threshold, wherein when it is determined that the ENL of the merged grid cell is greater than or equal to the predefined ENL threshold, concluding that coherence can reliably be estimated for the merged grid cell.

12. The method according to claim 11, wherein the step of regrouping the geocoded pixels inside the given grid cell with the geocoded pixels inside the at least one neighboring grid cell comprises:
determining whether or not there is at least one Rook's case neighboring grid cell;
when it is determined that there is at least one Rook's case neighboring grid cell,
determining ENL of the Rook's case neighboring grid cells, and
when at least one Rook's case neighboring grid cells have ENLs greater than zero, using a given Rook's case neighboring grid cell having a minimum ENL from amongst the at least one Rook's case neighboring grid cells, for merging with the given grid cell to generate the merged grid cell;
when it is determined that the at least one neighboring grid cell does not have Rook's case neighboring grid cells, determining whether or not the at least one neighboring grid cell has Queen's case neighboring grid cells;
when it is determined that the at least one neighboring grid cell has Queen's case neighboring grid cells,
determining ENL of the Queen's case neighboring grid cells, and
when at least one Queen's case neighboring grid cells have ENLs greater than zero, using a given Queen's case neighboring grid cell having a minimum ENL from amongst the at least two Queen's case neighboring grid cells, for merging with the given grid cell to generate the merged grid cell; and
when it is determined that the at least one neighboring grid cell does not have Queen's case neighboring grid cells,
determining ENL of all grid cells except the given grid cell, and
using a grid cell that is closest to the given grid cell and having an ENL greater than zero, for merging with the given grid cell to generate the merged grid cell.

13. The method according to claim 11, wherein when it is determined that the ENL of the merged grid cell is not greater than or equal to the predefined ENL threshold, the method further comprises:
determining whether or not all grid cells within the object are merged; and
concluding that coherence cannot reliably be estimated for the object when it is determined that all the grid cells within the object are merged.

14. The method according to claim 1, further comprising:
determining whether or not coherence can reliably be estimated for a given object for the at least one polarization, wherein said determination is made by evaluating the following expression (1) for the given object for each polarization:

$$\left(\sum_{\substack{pixels\ in\\object}} V3\right)^2 + \left(\sum_{\substack{pixels\ in\\object}} V4\right)^2 > 0 \text{ AND} \quad (1)$$

$$\sum_{\substack{pixels\ in\\object}} V1 * \sum_{\substack{pixels\ in\\object}} V2 > 0;$$

when it is determined that the expression (1) is TRUE for the given object for a given polarization, then expression (2) is used to determine a coherence value $\gamma_{polarization\ N}$ for the given object for the given polarization, wherein the expression (2) is:

$$\gamma_{polarization\ N} = \frac{\sqrt{\left(\sum_{\substack{pixels\ in\\object}} V3\right)^2 + \left(\sum_{\substack{pixels\ in\\object}} V4\right)^2}}{\sqrt{\sum_{\substack{pixels\ in\\object}} V1 * \sum_{\substack{pixels\ in\\object}} V2}}; \quad (2)$$

and
when it is determined that the expression (1) is FALSE for the given object for a given polarization, then concluding that coherence cannot be estimated for the given object for the given polarization.

15. The method according to claim 9, further comprising:
determining whether or not coherence can reliably be estimated for the at least one grid cell for the at least one polarization, wherein said determination is made by evaluating the following expression (3) for a given grid cell for each polarization:

$$\left(\sum_{\substack{pixels\ in\\grid\ cell}} V3\right)^2 + \left(\sum_{\substack{pixels\ in\\grid\ cell}} V4\right)^2 > 0 \text{ AND} \quad (3)$$

$$\sum_{\substack{pixels\ in\\grid\ cell}} V1 * \sum_{\substack{pixels\ in\\grid\ cell}} V2 > 0;$$

when it is determined that the expression (3) is TRUE for the given grid cell for a given polarization, then expression (4) is used to determine a coherence value $\gamma_{polarization\ N}$ for the given grid cell for the given polarization, wherein the expression (2) expression (4) is:

$$\gamma_{polarization\ N} = \frac{\sqrt{\left(\sum_{\substack{pixels\ in\\grid\ cell}} V3\right)^2 + \left(\sum_{\substack{pixels\ in\\grid\ cell}} V4\right)^2}}{\sqrt{\sum_{\substack{pixels\ in\\grid\ cell}} V1 * \sum_{\substack{pixels\ in\\grid\ cell}} V2}}; \quad (4)$$

and
    when it is determined that the expression (3) is FALSE for the given cell for a given polarization, then concluding that coherence cannot be estimated for the given grid cell for the given polarization.

16. The method according to claim 1, wherein the step of determining the statistics of coherence values for the objects for the at least one polarization is based on the coherence values of the grid cells from the given object for the given polarization, wherein the statistics comprise at least one of: a minimum value, a maximum value, an average value, a median value, a standard deviation value.

17. A system for creating interferometric coherence data products for objects imaged by an SAR having at least one polarization, the system comprising the processor configured to execute the method of claim 1.

18. A computer program product for creating interferometric coherence data products for objects imaged by an SAR having at least one polarization, the computer program product comprising a non-transitory machine-readable data storage medium having stored thereon program instructions that, when accessed by the processor, cause the processor to implement the method of claim 1.

* * * * *